United States Patent [19]
Lee, Jr. et al.

[11] Patent Number: 5,477,216
[45] Date of Patent: Dec. 19, 1995

[54] ELECTRICAL METERING DEVICE AND ASSOCIATED METHOD FOR TEMPORARILY STORING DATA DURING TRANSMISSION OF THE DATA TO A REMOTE COMMUNICATIONS DEVICE

[75] Inventors: Robert E. Lee, Jr., Dover; Marjorie J. Mancuso, Exeter; Gregory P. Lavoie, Newmarket; Susan D. Dastous, Milford, all of N.H.; Maurice J. Ouellette, North Berwick, Me.

[73] Assignee: General Electric Company, Schenectady, N.Y.

[21] Appl. No.: 968,959

[22] Filed: Oct. 30, 1992

[51] Int. Cl.⁶ ................................................. G08B 23/00
[52] U.S. Cl. .............................. 340/870.02; 340/870.03
[58] Field of Search ................... 340/870.01, 870.02, 340/310, 870.03, 309.15; 379/102, 106, 107, 42; 380/28

[56] References Cited

U.S. PATENT DOCUMENTS

| | | | |
|---|---|---|---|
| 3,702,460 | 11/1972 | Blose | 340/825.15 |
| 4,190,800 | 2/1980 | Kelly, Jr. et al. | 340/310.02 |
| 4,749,992 | 6/1988 | Fitzemeyer et al. | 340/870.02 |
| 5,193,111 | 3/1993 | Matty et al. | 379/106 |
| 5,268,666 | 12/1993 | Michel et al. | 340/310 |

OTHER PUBLICATIONS

Utility context, Part B Standard Protocol Tables, Electronics Industries Association, 2001 Pennsylvania Ave., N.W., Washington, D.C. 20006 (pp. 42–43, 69, 93–97).

Engineering Presentation to AEIC/EEI Meter and Service Committees, Apr. 8, 1991 (pp. 1–14).

Engineering Presentation to AEIC/EEI Meter and Service Committees, Sep. 9, 1991 (pp. 1–5).

GE UCNet System Brochure (Sep. 1991).

*Primary Examiner*—John K. Peng
*Assistant Examiner*—Ashok Mannava
*Attorney, Agent, or Firm*—Bell, Seltzer, Park & Gibson

[57] ABSTRACT

In one embodiment, the present invention is an algorithm implemented in a microprocessor-controlled system which, for example, is disposed within an energy meter housing. Particularly, the microprocessor is coupled to a communications interface which receives and transmits messages on a power line or some other external communications media. Upon receipt of a message, the commands contained in the message are read. If a command corresponds to a "buffer and lock" command, then a timer operated by the microprocessor starts to run. For example, if data to be retrieved from the system is data which is erased from system memory when read therefrom, just prior to reading such data, a buffer and lock command is transmitted by the external communication device. Upon receipt of such command, the microprocessor initiates running of a timer and the data is read from the meter. The data also is copied to a buffer, e.g., a RAM memory location. If the data is "lost" during transmission, and as long as the timer is running, the data can be copied from the designated buffer and re-transmitted. In this manner, data normally not saved in a meter subsequent to a read operation is saved and, if necessary, re-transmitted.

11 Claims, 8 Drawing Sheets

| COMMAND 1 | SEPARATOR | COMMAND 2 | SEPARATOR | ... | SEPARATOR | COMMAND N |

FIG. 7A.

| FIELD | DATA TYPE | LENGTH IN BYTES | DESCRIPTION |
|---|---|---|---|
| MESSAGE LENGTH | UNSIGNED INTEGER | 2 | 0 – 255 |
| MESSAGE | UNSIGNED CHARACTER | 2048 | |

FIG. 7B.

| RESPONSE 1 | SEPARATOR | RESPONSE 2 | SEPARATOR | ... | SEPARATOR | RESPONSE N |

FIG. 7C.

| FIELD | DATA TYPE | LENGTH IN BYTES | DESCRIPTION |
|---|---|---|---|
| RESPONSE LENGTH | UNSIGNED INTEGER | 2 | 0 – 255 |
| RESPONSE | UNSIGNED CHARACTER | 2048 | |

FIG. 7D.

| BUFFER # | FIELD | DATA TYPE | LENGTH IN BYTES | DESCRIPTION |
|---|---|---|---|---|
| 1 | TIMER | UNSIGNED INTEGER | 2 | 0 – 65535 MINUTES |
|  | COMMAND LENGTH | UNSIGNED CHARACTER | 1 | 0 – 255 |
|  | COMMANDS | UNSIGNED CHARACTER | 256 |  |
|  | RESPONSE LENGTH | UNSIGNED INTEGER | 2 | 0 – 255 |
|  | RESPONSE | UNSIGNED CHARACTER | 3072 |  |
| 2 | TIMER | UNSIGNED INTEGER | 2 | 0 – 65535 MINUTES |
|  | COMMAND LENGTH | UNSIGNED CHARACTER | 1 | 0 – 255 |
|  | COMMANDS | UNSIGNED CHARACTER | 256 |  |
|  | RESPONSE LENGTH | UNSIGNED INTEGER | 2 | 0 – 255 |
|  | RESPONSE | UNSIGNED CHARACTER | 3072 |  |
| ... |  |  |  |  |
| N | TIMER | UNSIGNED INTEGER | 2 | 0 – 65535 |
|  | COMMAND LENGTH | UNSIGNED CHARACTER | 1 | 0 – 255 |
|  | COMMANDS | UNSIGNED CHARACTER | 256 |  |
|  | RESPONSE LENGTH | UNSIGNED INTEGER | 2 | 0 – 255 |
|  | RESPONSE | UNSIGNED CHARACTER | 3072 |  |

FIG. 7E.

ELECTRICAL METERING DEVICE AND ASSOCIATED METHOD FOR TEMPORARILY STORING DATA DURING TRANSMISSION OF THE DATA TO A REMOTE COMMUNICATIONS DEVICE

BACKGROUND OF THE INVENTION

1. Field of the Invention

The present invention generally relates to the transmission of data from energy meters to a communication device external the meter, and more specifically, relates to avoiding the loss of data during transmission of such data over a communication medium.

2. Related Art

Transmitting data via radio, telephone, and power line communication links is well known. In addition, transmitting data from an energy meter disposed at a customer location to a central station via such communication links is well-known. Examples of such systems utilizing power-line/radio links are described in U.S. Pat. Nos. 3,702,460 and 4,749,992.

Transmitting metering data over such communication links, however, can present many challenges. Although communication technology has now progressed to being very reliable, there still exists a possibility for transmission problems. For example, it is possible that the transmitted data may not be correctly received by a receiver or possibly even lost during transmission. For some data-types (e.g., watthour readings), if the data is lost, another attempted transmission can be made. This is possible because the watthour data typically is retained in the meter memory and not erased.

Other types of meter data, however, typically are erased from meter memory immediately subsequent to reading such data. One type of such data is commonly known as "Maximum Demand." Demand is "[t]he average value of power or related quantity over a specified interval of time" and maximum demand is "[t]he highest demand measured over a selected period of time, such as one month." Handbook of Electricity Metering, Edison Electric Institute, Washington, D.C., Eight Edition (1981). As an example, a demand interval may be defined as thirty minutes and the maximum demand time period may be defined as one month. The maximum demand would be the highest demand measured during any thirty minute interval of the month.

When reading a demand meter, the maximum demand value is read and then immediately reset to zero. The maximum demand data therefore is immediately erased after reading. Resetting maximum demand cannot be delayed because if a maximum demand occurs between the time of reading and reset, the maximum demand for the previous time period is erased, i.e., replaced by the new maximum demand.

With human meter readers, where the reading is taken visually from a display on the meter, the meter reader can record the data and even double-check the data before resetting. When reading the data remotely, however, such as via a radio/power-line communication link, the maximum demand value is re-set once the data is transmitted. If the maximum demand data is lost during transmission, the data cannot be retrieved. Losing such data, of course, is not acceptable to the utility industry. Accordingly, there exists a need to provide a means and a method for storing data (e.g., maximum demand data) while remotely reading a meter.

SUMMARY OF THE INVENTION

In one embodiment, the present invention is an algorithm implemented in a microprocessor-controlled system which, for example, is disposed within an energy meter housing. Particularly, the microprocessor is coupled to a communications interface which receives and transmits messages on a power line or some other external communications media. Upon receipt of a message, the commands contained in the message are read. If a command corresponds to a "buffer and lock" command, then a timer operated by the microprocessor starts to run. For example, if data to be retrieved from the system is data which is erased from system memory when read therefrom, just prior to reading such data, a buffer and lock command is transmitted by the external communication device. Upon receipt of such command, the microprocessor initiates running of a timer and the data is read from the meter. The data also is copied to a buffer, e.g., a RAM memory location. If the data is "lost" during transmission, and as long as the timer is running, the data can be copied from the designated buffer and re-transmitted. In this manner, data normally not saved in a meter subsequent to a read operation is saved and, if necessary, re-transmitted.

BRIEF DESCRIPTION OF THE DRAWINGS

These and other objects of the present invention, together with further features and advantages thereof, will become apparent from the following detailed specification when read together with the accompanying drawings, in which:

FIGS. 7A–E illustrate formats and data structures for the data flows described in FIGS. 3–6.

DETAILED DESCRIPTION OF THE DRAWINGS

Figure 1:
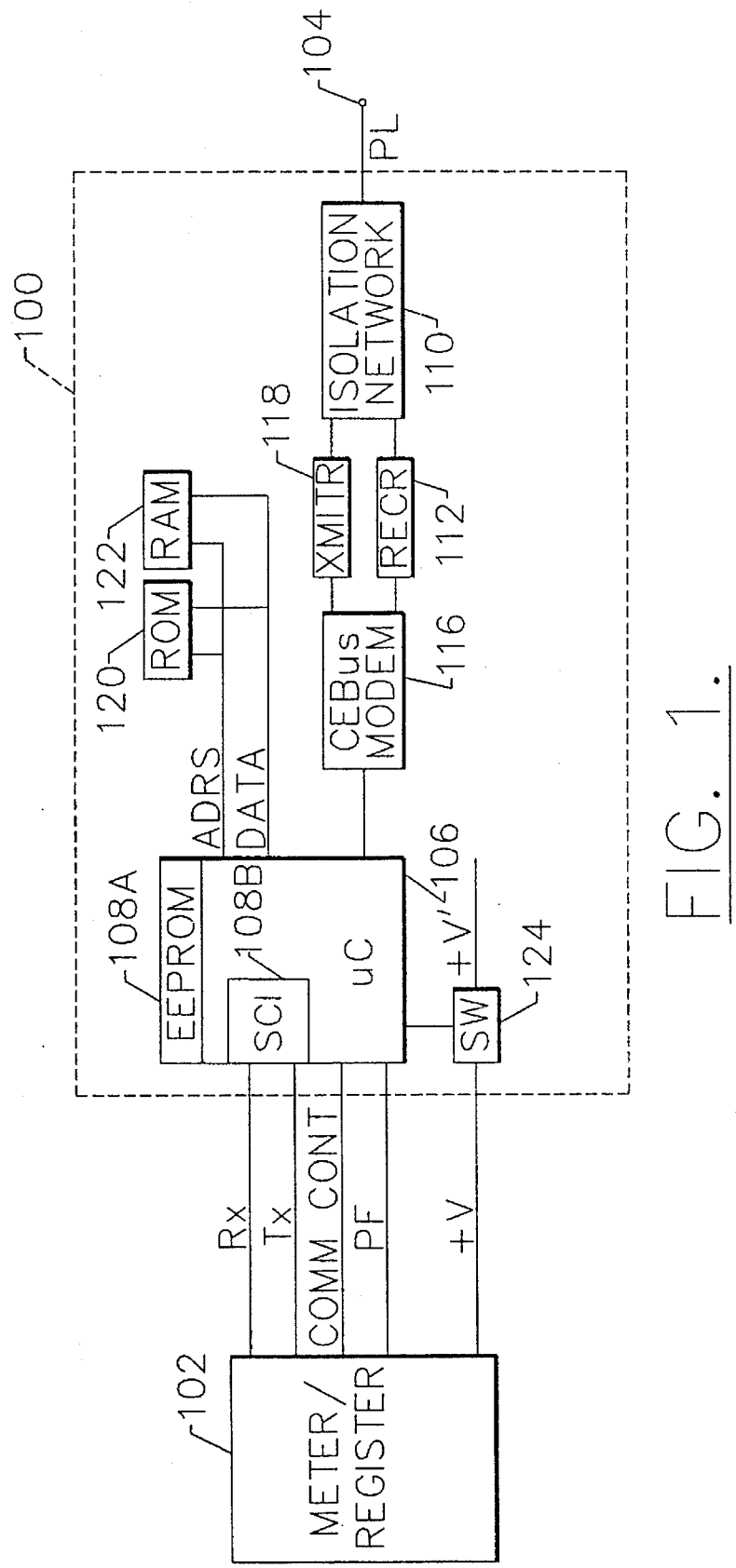
FIG. 1 is a block diagram description of one embodiment of a power line communication circuit which may be used to interface a meter/register with a power line for communicating via the power line to a communication device disposed external the meter and coupled to the power line.

FIG. 1 is a block diagram description of one embodiment of a power line communication circuit 100 coupled between a meter/register 102 and a power line 104. The circuit 100 enables communication, via the power line 104, between the meter/register 102 and, for example, an interrogation device (not shown) coupled to the power line 104. More particularly, the circuit 100 is sometimes referred to as a power line communication (PLC) circuit and may be embodied in a printed circuit board disposed within the housing of the electronic energy meter 102. The circuit 100 is shown separate from the meter/register 102 for illustration purposes only. An example of an electronic energy meter is the meter commonly known as the Phase3 meter which is commercially available from General Electric Company, 130 Main Street, Somersworth, N.H. 03878.

More particularly, the circuit 100 receives information transmitted over the power line 104. The information present on the power line 104 may, for example, be information sent from a communicating device disposed on a utility pole. Such communication device is coupled to the power lines disposed between the secondary side of a distribution transformer and a meter as described in U.S. Pat. Nos. 3,702,460 and 4,749,992 (relay module). The power line 104 may be one of such secondary distribution power lines.

The circuit 100 includes a micro-controller 106 which may be a Motorola 68HC11A1 Micro-controller. The micro-controller 106 includes a EEPROM 108A and a serial communications interface (SCI) 108B. The SCI 108B is utilized for communicating with the meter/register 102 via receive (Rx), transmit (Tx) and communication control (COMM CONT) lines. The circuit 100 also includes an isolation network 110 which couples to the power line 104 and blocks the 50/60 Hz line voltage present on the line 104. A receiver filter 112 serves as a filter/amplifier and removes any undesired signals from the signal output from the isolation network 110. The receiver filter 112 limits the received signal to the 100–400 kHz band and biases the signal for the CEBus modem 116. The modem 116 may be the Intellon SSM10CE spread spectrum power line communication microchip. A transmitter filter 118 operates in the same manner as the receiver filter 112 except that the transmitter filter 118 is for signals to be placed on the power line 104.

The circuit 100 also includes a ROM 120 and a RAM 122 coupled to the micro-controller 106 via address (ADRS) and data (DATA) lines, and a power switch 124. Power for the circuit 100 is provided from a voltage +V' coupled through the switch 124 from a voltage +V provided by the meter/ register 102.

Briefly, in operation, data is transmitted and received over the power line 104 in CEBus defined "packets" which may consist of a preamble, a packet body, and a CRC code. Further details regarding CEBus operations are provided hereinafter. When an in-band signal is received, the CEBus modem 116 demodulates the signal and after recognizing the preamble, alerts the micro-controller 106 of an incoming message. When the packet body is received and demodulated, the modem 116 transfers the body as serial data to the micro-controller 106 in 8-bit bytes.

The micro-controller 106, through its programmed operational code stored in the ROM 120, accepts the input request from the modem 116 and performs the requested task. The task could involve assembling data from the RAM 122 or from the meter/register 102. The micro-controller 106 communicates with the meter/register 102 via the SCI 108B which permits asynchronous data interchange. The data is then fed to the modem 116 for transmission through the transmitter filter 118 and isolation network 110 to the power line 104.

A power fail line (PF) output from the meter/register 102 also is provided to the micro-controller 106. If the meter/ register 102 indicates an impending power outage, the micro-controller 106 stops any data transfer on the power line 104, stores all necessary parameters in the internal EEPROM 108A, and then opens the power switch 124. In this manner, data can be saved.

Further details regarding the Motorola 68HC11A1 micro-controller are set forth in the M68HC11 Reference Manual, Revision 3, 1991, available from the Motorola Literature Distribution Center, P.O. Box 20912, Phoenix, Ariz., 20912. Further details regarding the Intellon SSM10CE spread spectrum power line communication microchip are set forth in the Intellon Advance Information: SSC PLCE CEBus Spread Spectrum Power Line Modem available form Intellon Corporation, 5150 West Highway 40, Ocala, Fla., 34482.

Figure 2:
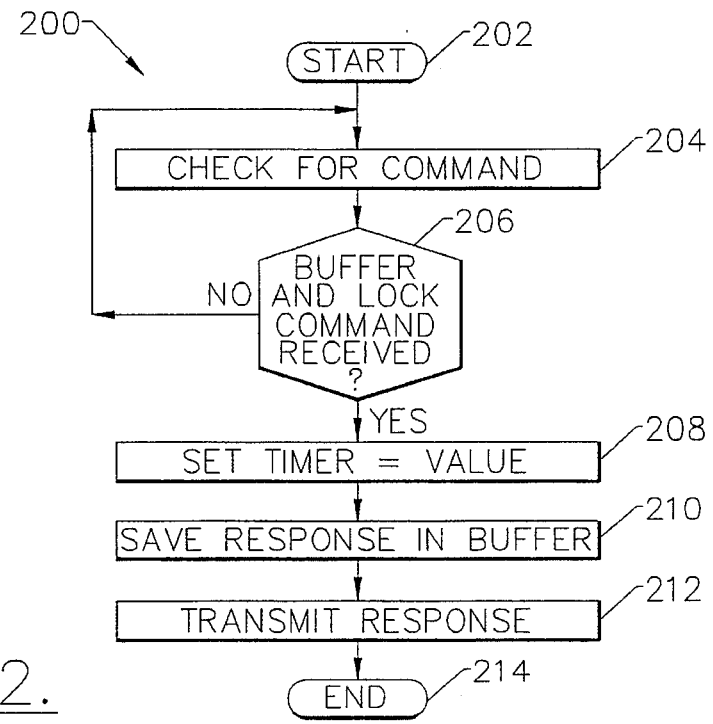
FIG. 2 is a flow chart illustrating a first embodiment of a sequence of process steps in accordance with the present invention.

FIG. 2 is a flow chart 200 illustrating a first embodiment of the present invention. The operations illustrated in FIG. 2 would be executed by the processor 106 acting under the control of a program stored in the ROM 102. Particularly, once operations start (202), the processor 106 checks (204) whether a command is contained in a message previously stored in the RAM 122. If the command is not a buffer and lock command (206), then the RAM 122 is checked again for a next command. If the command is a buffer and lock command, then running of a timer is initiated (208). The timer, for example, could be a software implemented timer run by the processor 106 in a manner well-known in the art. The duration of the time period for which the timer is to run is controlled by a "TIMER" field contained in the buffer and lock command structure. The response, i.e., the data to be transmitted, is then copied to a buffer (210)—that is, a designated RAM 122 memory location. The response is then transmitted (212) via a communications link, e.g., power line 104, to an external device. Operations then end (214).

The data copied to the buffer in the RAM 122 (step 210) is stored at least until the timer times out. That is, no additional data is written to the buffer while the timer is active. The buffered data, however, can be copied from the buffer and re-transmitted. Therefore, if the first transmission of the data fails, the data can be re-transmitted.

In the foregoing manner, data which may be lost as a result of a read operation is preserved. In the event that the data needs to be re-transmitted, a pre-designated buffer simply is copied and the data is re-transmitted.

Figure 3A:
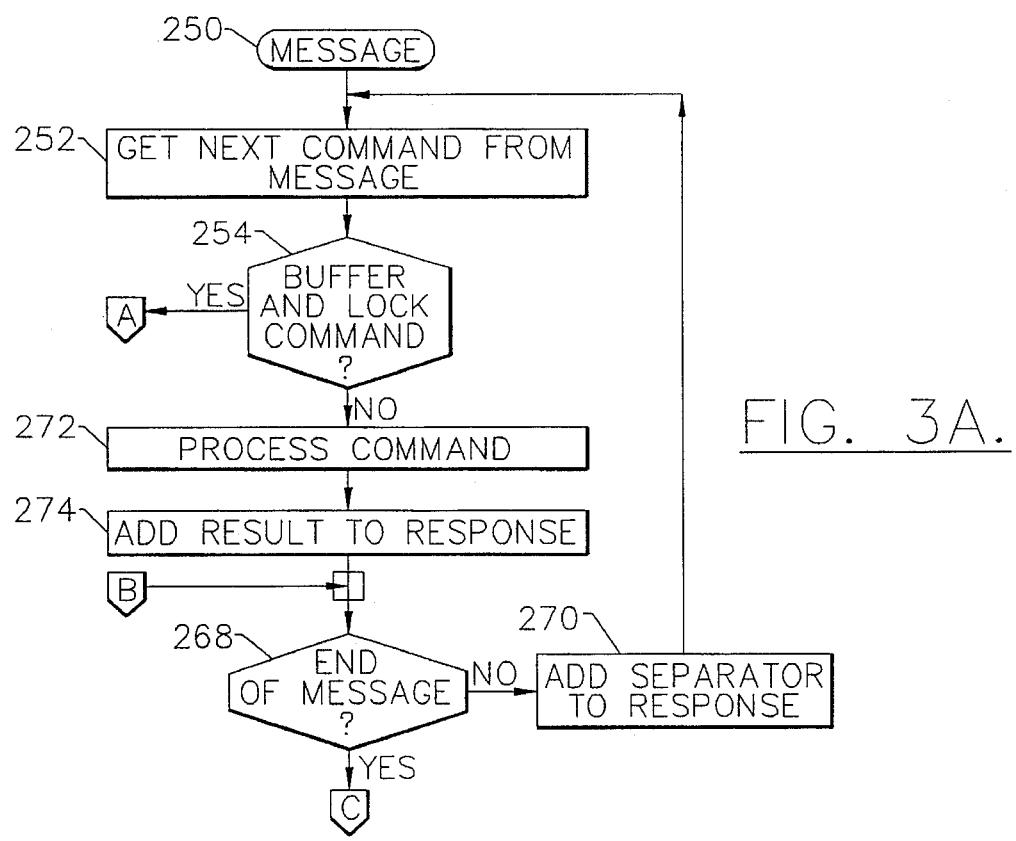
FIGS. 3A–C is a more detailed flow chart illustrating a second embodiment of a sequence of process steps in accordance with the present invention.

FIG. 3 is a more detailed flow chart illustrating a sequence of process steps in accordance with another embodiment of the present invention. The flow chart describes operation of the present invention in a Common Application Language (CAL) context for communicating over powerlines in a manner as defined by the CEBus Committee of the Electronics Industries Association (EIA), 2001 Pennsylvania Avenue, N.W., Washington, D.C., 20006. Information regarding CAL and CEBus communication is available from the EIA.

To facilitate an understanding of the present invention in such a context, a data flow diagram (FIG. 4), a CEBus task data flow diagram (FIG. 5), and a CAL task data flow diagram (FIG. 6) are provided. Data structures are set forth in FIGS. 7A–E. In addition, a more detailed explanation of CEBus is provided in Appendix A.

A CEBus task is composed of five (5) layers. Particularly, a CEBus task is composed of an application layer, message transfer sub-layer, network layer, data link layer and a physical layer. The purpose of these layers is to reliably transmit and receive CAL message/responses between devices, e.g., between a meter and a remote interrogation unit. The message format and data structures are set forth in FIGS. 7A–B. The response format and data structures are set forth in FIGS. 7C–D. If the message/response to be transmitted by the application layer is more than 31 bytes, the message/response must be divided into 29-byte segments. Each segment is ultimately translated into symbols which are transmitted over the power line. When receiving a message/response, symbols are received from the power line. These symbols are decoded into segments which are assembled into a complete message/response. More detailed information regarding such operations is available from the EIA in IS-60 CEBus Volume 4 Node Protocol Draft Standard, and more particulalry, "CAL Specification," "Utility Context Part A CAL Definition" and "Utility Context Part B Standard Protocol Tables."

Figure 4:
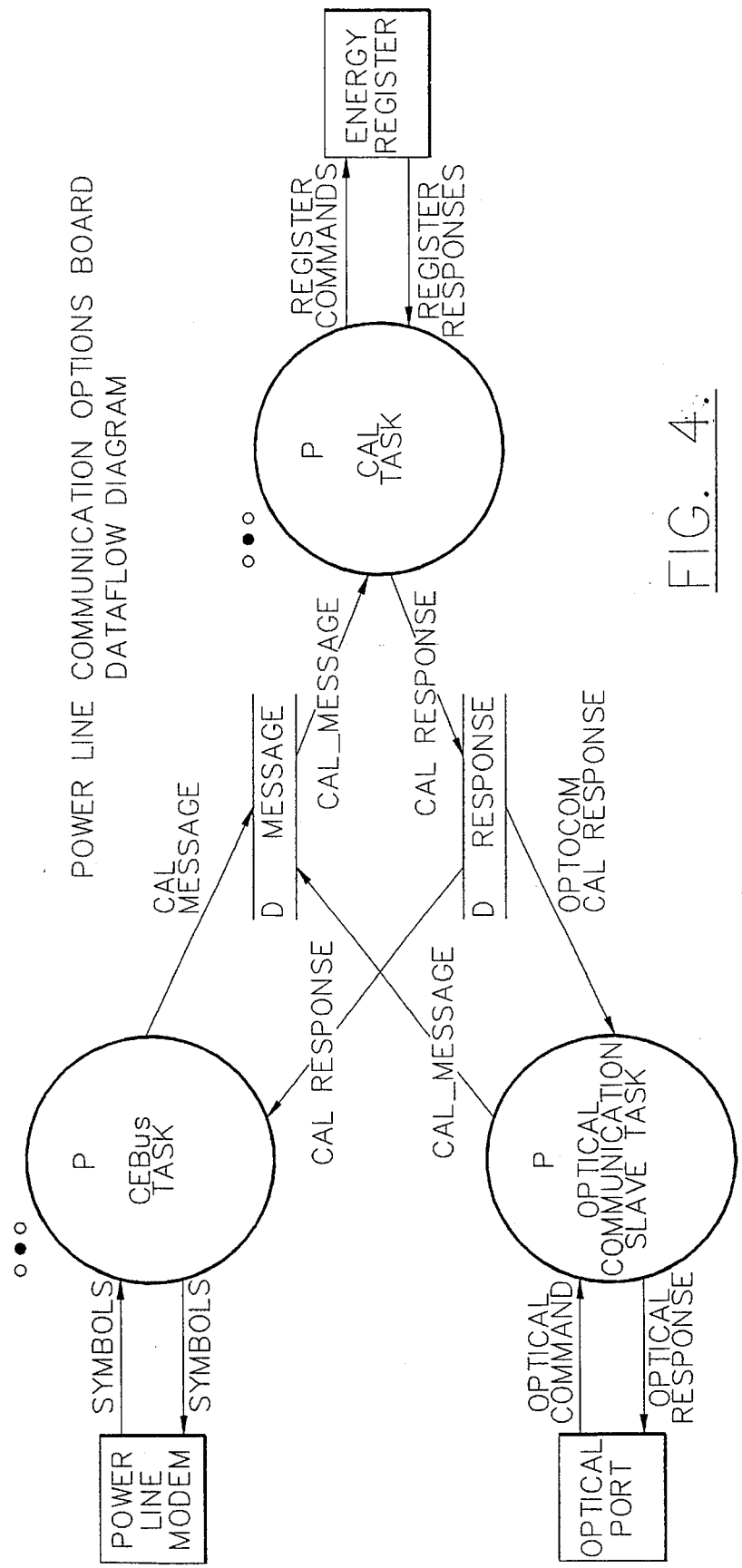
FIG. 4 is a data flow diagram for a power line carrier application.

Referring to FIG. 4, the CEBus Task, CAL Task and Optical Communication Slave Task correspond to processes performed by the processor 106 under the control of task programs stored in the ROM 120. The data message/response inputs/outputs for each process are stored in the RAM 122.

Figure 5:
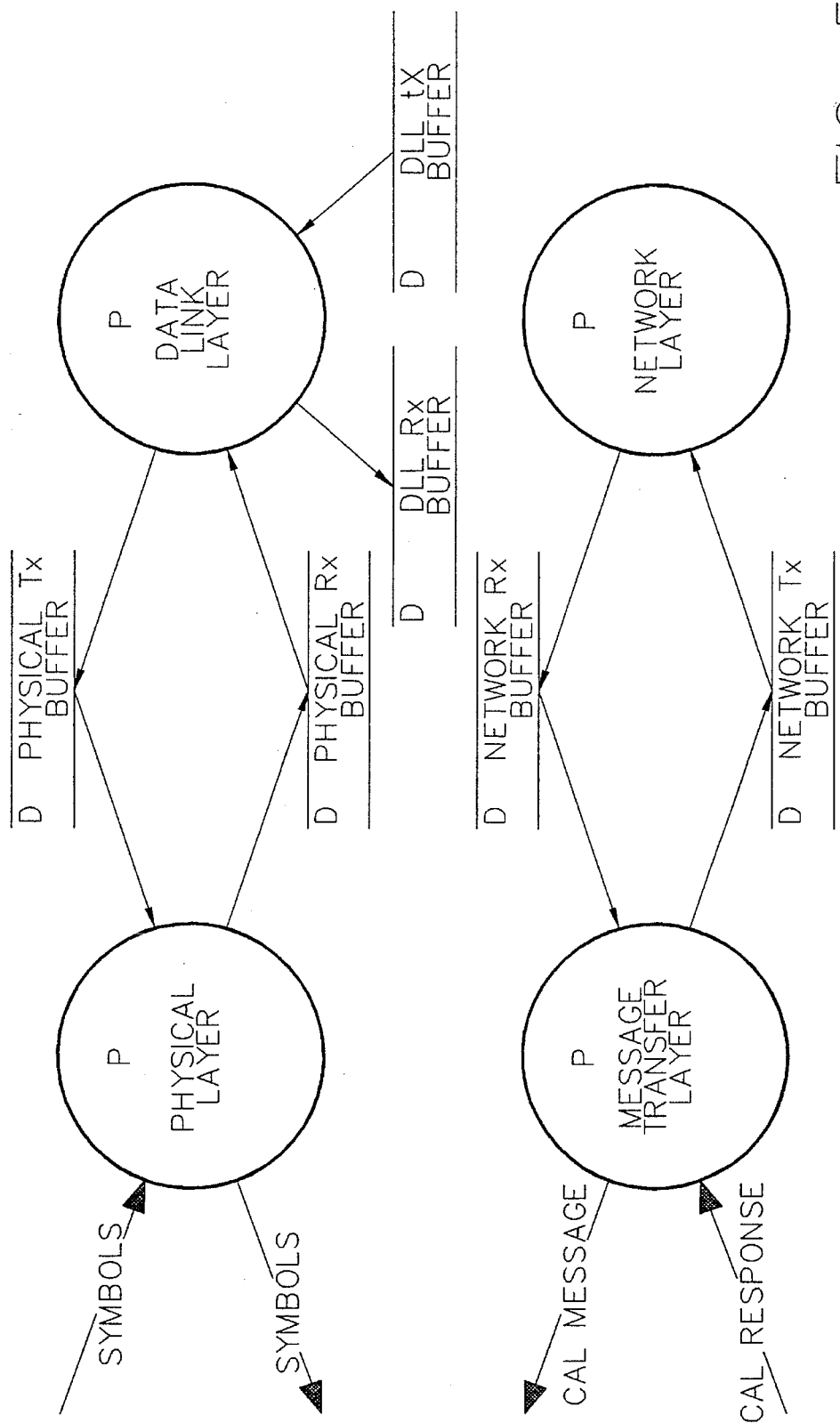
FIG. 5 is a CEBus task data flow diagram.

In operation, and by way of example, encoded symbols from the power line modem 116 serve as input for the CEBus Task. FIG. 5 illustrates data flow through the CEBus Task process, e.g., conversion of encoded symbols to a CAL message. Specifically, processes are performed for the physical layer, the data link layer, the network layer, and the message transfer sublayer. Transfer and receive data buffers are associated with each layer.

Figure 6:
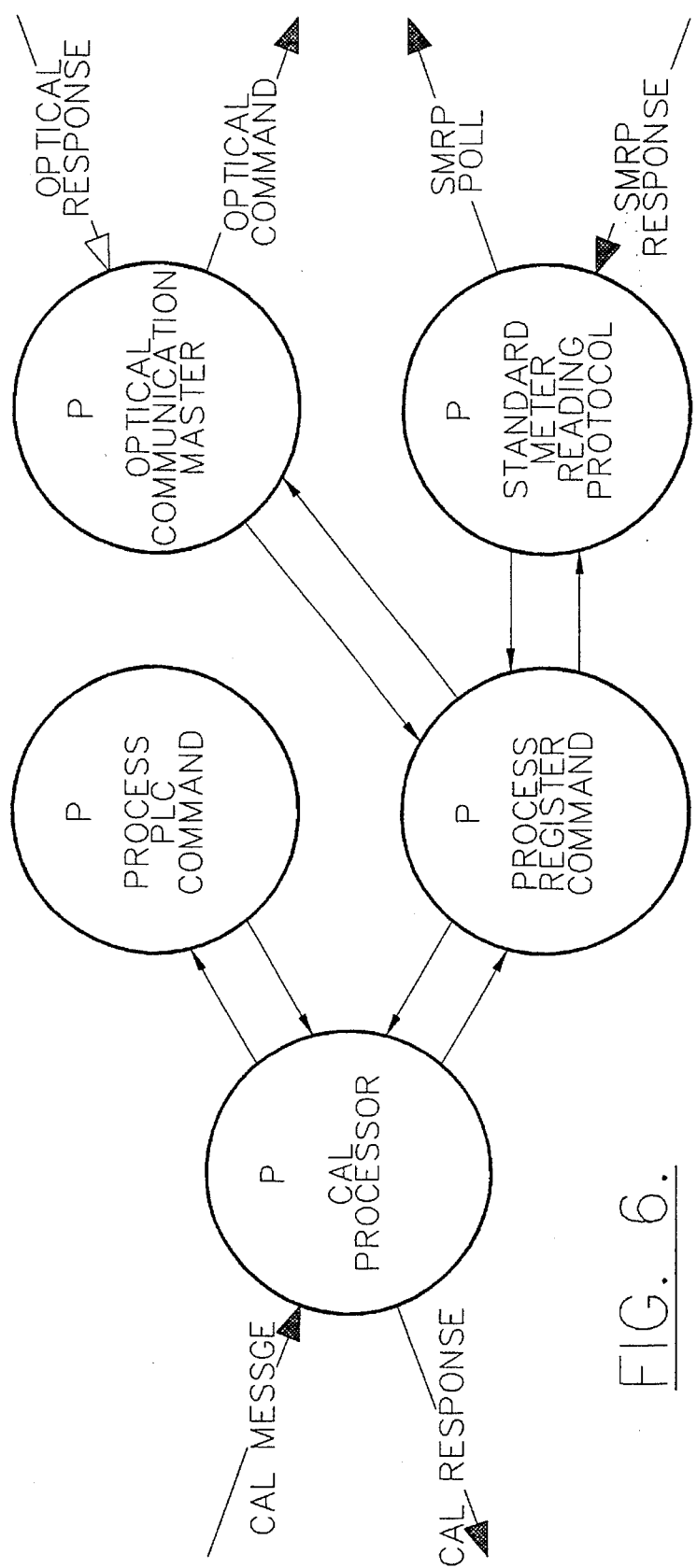
FIG. 6 is a CAL task data flow diagram.

The CAL Message output by the CEBus Task process is provided as input for the CAL Task process. FIG. 6 illustrates data flow through the CAL Task process. Particularly, with respect to the CAL task, a command input to the processor 106 is either a Process PLC Command or a Process Register Command. The Process Register Command translates the CAL command into a format compatible with the Standard Meter Reading Protocol or optical communications protocol such as General Electric Company's Optocom communications protocol. Utilizing either protocol, it is possible to communicate with a compatible electronic meter register. As illustrated in FIG. 4, Register Commands and Register Responses may be provided from/to the CAL Task process.

The CAL Response is output to the RAM 122 and may be communicated externally via an optical communications port through an Optical Communications Slave Task or via the power line modem 116 through the CEBus Task. Further details with respect to the contents of each layer and the purpose for the CAL and CEBus architectures are available from the EIA as hereinbefore referenced. In addition, further details regarding the Standard Meter Reading Protocol and Optocom Protocol are available from General Electric Company, 130 Main Street, Somersworth, N.H. 03878.

The foregoing data flow diagrams are provided herein primarily for background purposes to facilitate an understanding of one context in which the present invention may be utilized. It is contemplated, of course, that the present invention can be utilized in many other contexts.

Referring again to FIG. 3, once the CEBus task has received a complete message from the power line 104 through the modem 116, the message and its length are stored (250) in a message data structure (FIG. 7B) and the CAL task is called to process the message (FIG. 7A). The CAL task begins with step 252 wherein the next command from the message is retrieved. A command consists of the context, object, method and any accompanying data. A determination (254) is made whether the current command is a buffer and lock command. Note that the value of the Buffer Number and Minutes is not significant in this determination. The format for a buffer and lock command is a write standard table 40 function 19 as illustrated below:

| Buffer & Lock Command Format | |
|---|---|
| Utility Context | 50 h |
| Table Data Object | 02 h |

| Buffer & Lock Command Format (-continued) | |
|---|---|
| set Array Method | 46 h |
| Data Token | F4 h |
| Length | 32 h |
| Escape Token | F6 h |
| Table Number LSB | 28 h |
| Table Number MSB | 00 h |
| Delimiter Token | F5 h |
| Delimiter Token | F5 h |
| Data Token | F4 h |
| Length | 34 h |
| Escape Token | F6 h |
| Buffer & Lock Function | 13 h |
| Buffer Number | xx h |
| Minutes LSB | xx h |
| Minutes MSB | xx h |

The data structure for the buffer and lock command is illustrated in FIG. 7E. If the current command is a buffer and lock command, and as illustrated in FIG. 3C, the timer (as hereinbefore described) for the specified Buffer Number is checked to see if it is still running (256). This determination is performed by checking a two-byte value representing the number of minutes left on the timer. If the value of the timer is zero, the timer has expired. If the timer has expired, then the buffer is not currently in use. If the buffer is not in use, the timer is set to the number of Minutes specified in the command (258). The current response position is then saved 260 (i.e., the pointer in RAM which, at this time, is pointing to the position in the response buffer where the results of the buffer and lock command will be stored) and the remainder of the message (the command separator following the buffer and lock command to the end of the message) is copied into the appropriate command buffer and the length is saved (262). A Result Completed status is stored in the response buffer and the response length is updated (264). A flag is then set to indicate that a buffer and lock command is pending (266).

Referring again to FIG. 3A, if the end of the message has not been reached (268) the command separator used to separate the next command in the message is copied into the response buffer to separate responses (270) and operations return to Step 252. If the command is not a buffer and lock command (254), the command is processed (272). Processing the command, for example, may require communication with the energy register. The results of the command are stored in the response and the length of the response is updated (274). This process continues until the end of the message is reached (268).

Figure 3B:
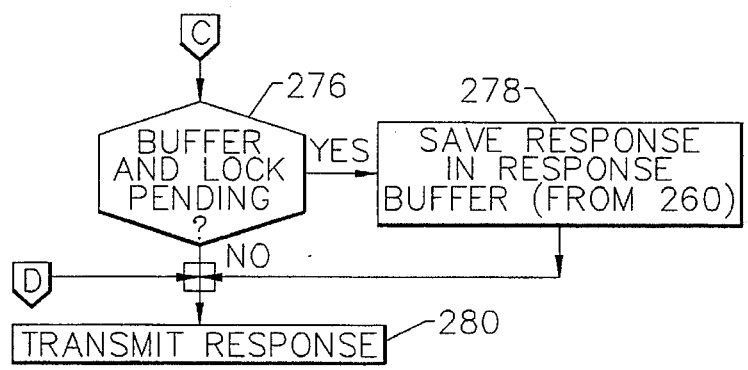
Figure 3C:
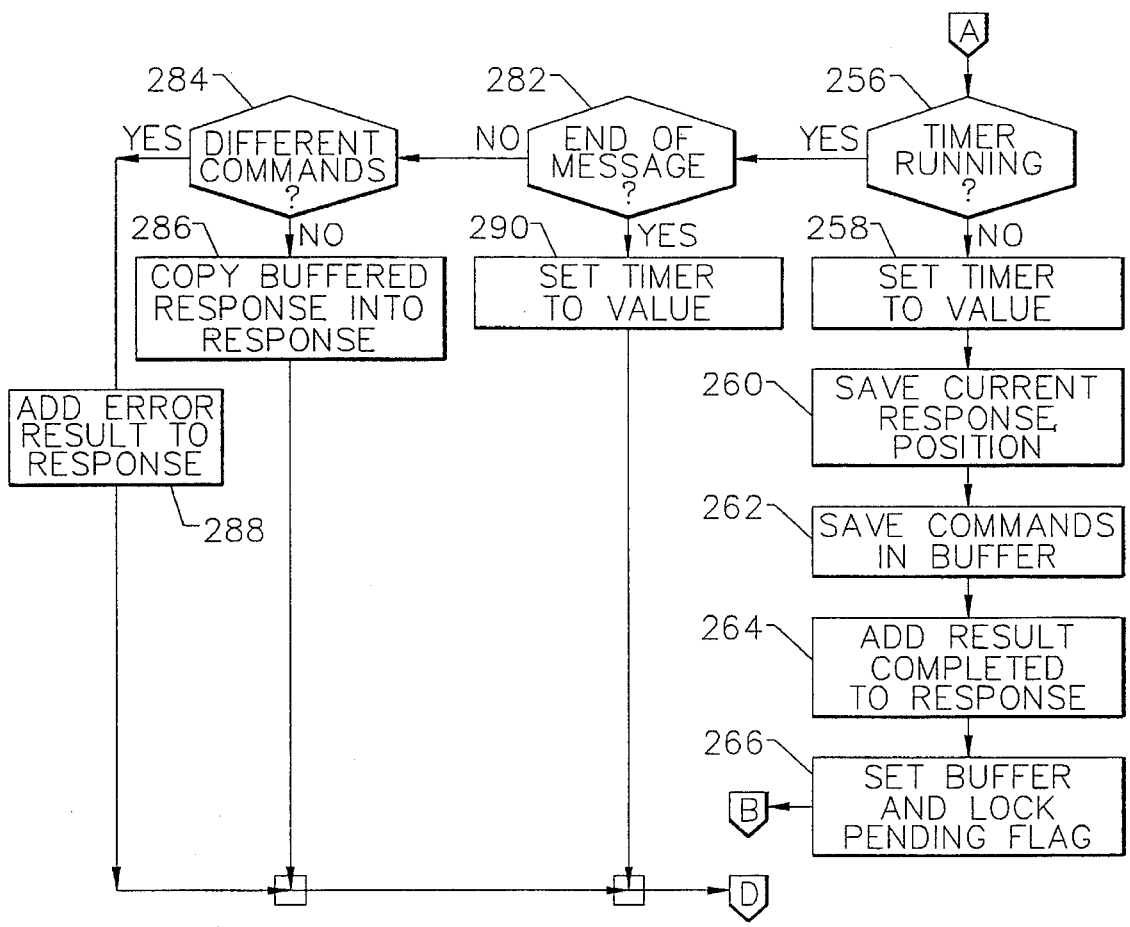

Once all of the commands have been processed (268), and referring to FIG. 3B, if the flag which indicates that a buffer and lock command pending is set (276), and starting at the position saved in step (270), the response is copied into the appropriate response buffer and the length is updated (278). The CAL task is now finished and the CEBus task can transmit the response (280).

If the response is lost in transmission (280), the requester sends the same message (250) a second time. If the timer for the buffer is still running (256), the buffer and lock command buffer and command length for the given buffer number is compared against the remaining commands (282) (i.e., from the separator following the buffer and lock command to the end of the message). Since the commands are identical (284), the response stored in the buffer and lock response buffer from step 278 is copied into the response buffer and the length updated (286) and the CAL task is complete. The CEBus task can now transmit the duplicate response. As long as the re-transmission request is received, while the timer is running, data can be retrieved and re-transmitted. The duration of timer operation, therefore, is important and may vary depending on the data being saved. As an example, it may be desirable to save demand data for three days or even longer depending upon when it can be determined whether accurate data was received.

If the CAL task receives a message to buffer and lock a different message for a buffer that is already active (256), since there are more commands in the message (282) and the commands remaining the messages are not identical to the commands stored in the buffer and lock command buffer (284) an Error Result is copied into the response (288) and the error response is transmitted by the CEBus task. The format for the error result is:

| Processing Error Response Format | |
|---|---|
| Error Result | 02 h |
| Data Token | F4 h |
| Length | 31 h |
| Escape Token | F6 h |
| Processing Error | 0A h |

If the response was received successfully, the operator may wish to "unlock" the buffer to allow it to be reused for another message. In this case the CAL task is given a message (250) which only contains a buffer and lock command (i.e., no other commands in the message). The timer for the buffer is set to the value (290) in the command. If the value is zero, the buffer is unlocked.

Although the present invention has been described herein in a specific context, i.e., power line carrier communications, it should be understood that the present invention has applicability in many other contexts such a direct radio communications between a meter and a central radio interrogation unit. The present invention, therefore, is not to be limited to the power line communication context.

While the present invention has been described with respect to specific embodiments, many modifications, variations, substitutions, and equivalents will be apparent to those skilled in the art. Accordingly, the invention is to be considered as limited only by the spirit and scope of the appended claims.

What is claimed is:

1. An electrical metering device for measuring power consumption of an electrical load associated with the electrical metering device; the electrical metering device comprising:

meter register means for processing the measured power consumption of the associated electrical load to produce load profile data related thereto;

memory means for storing the processed load profile data;

buffer control means for copying at least a predetermined type of the load profile data from the memory means to a buffer, separate from the memory means, in response to a predetermined command from a remote communications device such that the copied load profile data is temporarily stored in the buffer and additional load profile data is stored by said meter register means in the memory means;

means for bidirectionally communicating between said meter register means and the remote communications device wherein said bidirectional communicating means includes means for transmitting load profile data, including the predetermined types of load profile data temporarily stored in the buffer, to the remote communications device, in response to the predetermined command from the remote communications device;

a timer for controlling a time period for which the predetermined portion of the load profile data is stored in the buffer wherein duration of said timer is set by the predetermined command from the remote communications device; and means for unlocking the buffer prior to the expiration of the time period computed by said timer such that said buffer control means copies additional load profile data of at least the predetermined type from the memory means to the buffer in response to another predetermined command from the remote communications device.

2. An electrical metering device according to claim 1 wherein said bidirectional communicating means further includes means for retransmitting load profile data, including the predetermined portion of load profile data temporarily stored in the buffer, to the remote communications device, in response to a predetermined command from the remote communications device wherein the load profile data is only retransmitted within the time period computed by said timer.

3. An electrical metering device according to claim 1 further comprising means for generating a predetermined error message in response to a request by the remote communications device for additional load profile data prior to the expiration of the time period computed by said timer, wherein the request by the remote communications device for additional load profile data includes the predetermined command to copy the additional load profile data from the memory means to the buffer.

4. An electrical metering device according to claim 1 wherein the load profile data includes watthour data and maximum demand data, and wherein said buffer control means includes means for copying the maximum demand data from the memory means to the buffer such that additional maximum demand data is stored in the memory means while the watthour data and maximum demand data are transmitted to the remote communications device.

5. An electrical metering device according to claim 1 wherein the remote communications device comprises a power line associated with the electrical metering device, and wherein said means for bidirectionally communicating further includes:

a modem for receiving commands from the power line and transmitting load profile data to the power line;

a microprocessor, operatively connected to said modem and responsive to the received commands, for controlling the transmission of the load profile data; and read only memory means, operatively connected to the said microprocessor, for storing instructions for controlling the operation of said microprocessor.

6. A method of transmitting load profile data from an electrical metering device, the load profile data being indicative of power consumption of an electrical load associated with the electrical metering device, the method comprising the steps of:

measuring the power consumption of an electrical load associated with the electrical metering device;

tabulating load profile data related to the measured power consumption of the associated electrical load;

storing the tabulated load profile data in a memory means;

receiving a predetermined command from a remote communications device requesting transfer of the load profile data stored in the memory means;

copying at least a predetermined type of the load profile data from the memory means to a buffer, separate from the memory means, in response to the predetermined command, said copying step comprising a step of temporarily storing at least the predetermined type of load profile data in the buffer;

transmitting load profile data, including the predetermined type of load profile data copied to the buffer, to the remote communications device in response to the predetermined command;

storing additional tabulated load profile data of at least the predetermined type in the memory means during the transmission of the requested load profile data;

initializing a timer in response to a command from the remote communications device which includes a time period for which the predetermined type of load profile data is to be temporarily stored in the buffer;

controlling the time period with the timer; and unlocking the buffer prior to expiration of the time period computed by the timer such that load profile data of the predetermined type is copied from the memory means to the buffer in response to another predetermined command received from the remote communications device.

7. A method according to claim 6 further comprising the steps of:

receiving a predetermined command from the remote communications device indicative of an error during transmission of the load profile data;

determining if the time period computed by the timer has expired; and if the time period computed by the timer has not expired, retransmitting the load profile data, including the predetermined type of load profile data copied to the buffer, to the remote communications device in response to the predetermined command indicative of a transmission error.

8. A method according to claim 6 further comprising the step of generating a predetermined error message in response to a request received from the remote communications device for additional load profile data prior to the expiration of the time period computed by the timer, wherein the request by the remote communications device for additional load profile data includes the predetermined command to copy the additional load profile data from the memory means to the buffer.

9. A method according to claim 6 wherein the load profile data includes watthour data and maximum demand data, and wherein said copying step comprises the step of copying the maximum demand data from the memory means to the buffer such that additional maximum demand data is stored in the memory means during said transmitting step.

10. A method according to claim 6 wherein said step of measuring the power consumption includes the step of measuring the power consumption of an electrical load from a power line associated with the electrical metering device, wherein said step of receiving a predetermined command includes the step of receiving the predetermined command, via the power lines, and wherein said step of transmitting load profile data includes the step of transmitting load profile data via the power lines.

11. A method according to claim 6 further comprising the steps of detecting an impending power outage and storing the load profile data requested by the remote communications device.

* * * * *